United States Patent [19]

Yasui

[11] Patent Number: 5,000,464
[45] Date of Patent: Mar. 19, 1991

[54] GASKET WITH A FLUID HOLE REGULATION DEVICE

[75] Inventor: Hisashi Yasui, Tokyo, Japan

[73] Assignee: Ishikawa Gasket Co., Ltd., Tokyo, Japan

[21] Appl. No.: 340,653

[22] Filed: Apr. 20, 1989

[51] Int. Cl.⁵ .............................................. F16J 15/08
[52] U.S. Cl. ............................ 277/235 B; 277/DIG. 6
[58] Field of Search ............... 123/41.08, 41.79, 41.02, 123/41.28; 236/93 R, 101 E, 16; 277/235 B, 26, DIG. 6; 220/201

[56] References Cited

U.S. PATENT DOCUMENTS

| 2,188,876 | 1/1940 | Fahlman | 123/41.28 |
| 4,653,761 | 3/1987 | Baugh et al. | 277/235 B X |
| 4,683,844 | 8/1987 | Arai et al. | 277/235 B X |
| 4,714,260 | 12/1987 | Udagawa | 277/235 B |
| 4,783,271 | 11/1988 | Silverwater | 210/168 X |

FOREIGN PATENT DOCUMENTS

| 355208 | 1/1922 | Fed. Rep. of Germany | 236/93 |
| 510960 | 10/1930 | Fed. Rep. of Germany | 123/41.02 |
| 575607 | 2/1946 | United Kingdom | 236/93 |
| 1076494 | 7/1967 | United Kingdom | 220/201 |

Primary Examiner—Allan N. Shoap
Assistant Examiner—Scott Cummings
Attorney, Agent, or Firm—Kanesaka and Takeuchi

[57] ABSTRACT

A gasket of the invention is installed in an internal combustion engine with at least one fluid hole. The gasket comprises a main body adapted to be installed in the engine and having at least one first hole communicating with the fluid hole of the engine, and a fluid hole regulation device installed in the first hole of the main body. The fluid hole regulation device includes a second hole, and at least one plate arranged so that a size of the second hole changes according to a temperature of the engine. The size of the second hole enlarges only when the water temperature exceeds a predetermined value.

2 Claims, 2 Drawing Sheets

GASKET WITH A FLUID HOLE REGULATION DEVICE

BACKGROUND OF THE INVENTION AND RELATED ART STATEMENT

The present invention relates to a gasket with a fluid hole regulation device for controlling an amount of fluid flowing through an engine based on a temperature of the engine.

In an internal combustion engine, the engine is cooled by air or water to properly operate the engine. In an engine cooled by water, when the engine is started, the temperature of the engine is low. Therefore, it is preferable that an amount of water circulating through the engine is minimum. On the other hand, since the temperature of the engine raises as the engine operates, it is required to cool the engine by circulating water as much as possible.

Also, in a winter season, temperature of an engine does not raise so high while the engine is operating. Therefore, an amount of water circulating through the engine need not be great.

Namely, it is preferable to control the temperature of the engine based on the predetermined temperature of the engine. In other words, an engine is preferably cooled only when the temperature of the engine raises beyond a predetermined temperature. As a result, the engine can efficiently operate.

In a conventional engine, a temperature sensing device and flow controlling device are equipped with an engine to measure the temperature of water flowing through the engine and to control an amount of water flowing through the engine. This convention system operates fairly well. However, it requires two devices, i.e. temperature sensing device and flow controlling device. Therefore, a simple device instead of the temperature sensing device and flow controlling device has been requested.

Accordingly, one object of the invention is to provide a gasket with a fluid hole regulation device for controlling an amount of water flowing through an engine based on the temperature of water circulating through the engine.

Another object of the invention is to provide a gasket as stated above, wherein the fluid hole regulation device is simple and can be attached to a desired gasket.

A further object of the invention is to provide a gasket as stated above, wherein the fluid hole regulation device is installed inside the engine to thereby make the engine compact.

Further objects and advantages of the invention will be apparent from the following description of the invention.

SUMMARY OF THE INVENTION

In accordance with the present invention, a gasket is installed in an internal combustion engine with at least one fluid hole, i.e. water hole. The gasket comprises a main body adapted to be installed in the engine and having at least one first hole communicating with the fluid hole of the engine, and a fluid hole regulation device installed in the first hole of the main body. The fluid hole regulation device includes a second hole, and at least one plate arranged so that a size of the second hole changes according to a temperature of the engine.

The plate is made of a shape memory alloy, and bends to enlarge the size of the second hole when the temperature of water circulating through the engine increases beyond a predetermined temperature. As a result, only when the temperature of water circulating through the engine increases beyond the predetermined temperature, the size of the fluid hole regulation device enlarges to allow large amount of water to pass therethrough. The temperature of the engine, therefore, decreases.

The fluid hole regulation device may be provided with at least one spring member, which pushes the plate to return to a first position when the temperature of water circulating through the engine decreases beyond the predetermined temperature. Namely, in case the water temperature increases beyond the predetermined temperature, the plate pushes the spring member to enlarge the second hole. In case the water temperature decreases beyond the predetermined temperature, the spring member pushes the plate to return to the first position.

The fluid hole regulation device may be provided with a plurality of plates to regulate the size of the second hole.

DETAILED DESCRIPTION OF PREFERRED EMBODIMENTS

Figure 1:
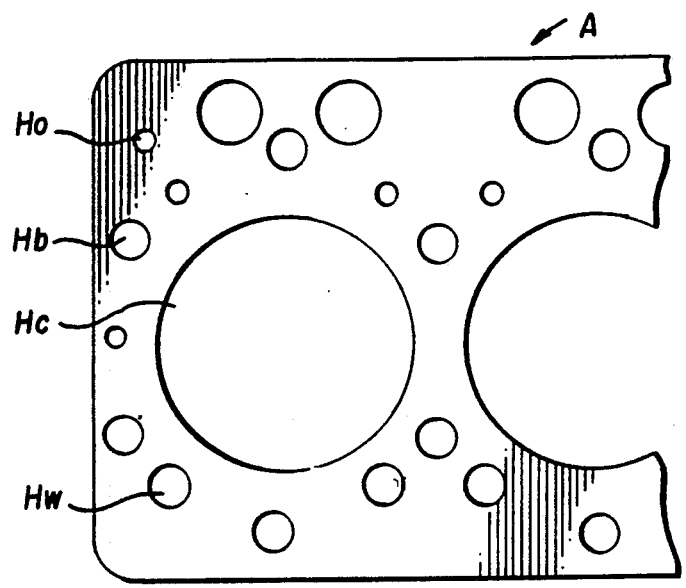
FIG. 1 is a plan view of a part of a gasket of the present invention.

Referring to FIG. 1, a first embodiment A of a gasket of the present invention is shown. The gasket A is a cylinder head gasket and is provided with a plurality of cylinder holes Hc, water holes Hw, oil holes Ho and bolt holes Hb, as in the conventional gasket.

In the gasket A, the areas around the cylinder holes Hc and oil holes Ho are sealed by suitable mechanism. Since the sealing mechanism around the cylinder holes Hc and oil holes Ho is not the subject matter of the present invention, the sealing mechanism is not explained. Any suitable sealing mechanism may be employed.

Figure 2:
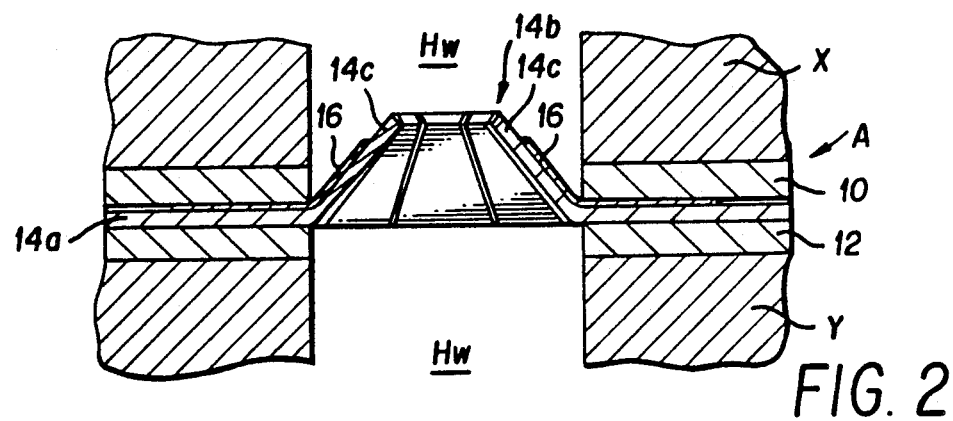
FIG. 2 is an enlarged explanatory section view of a part of a gasket with a fluid hole regulation device for showing a fluid hole reduced condition, wherein the gasket is installed between a cylinder head and a cylinder block.
Figure 3:
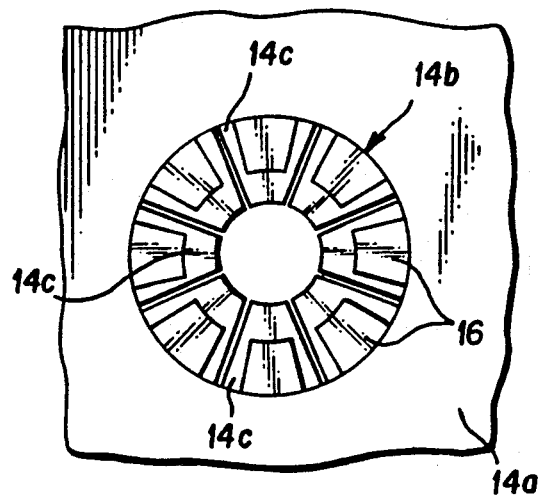
FIG. 3 is an explanatory plan view of a gasket as shown in FIG. 2.

As shown in FIG. 2, the gasket A comprises an upper gasket material 10, and a lower gasket material 12, between which a fluid hole regulation device 14 is installed. The fluid hole regulation device 14 comprises an outer portion 14a, and an inner portion 14b located inside the outer portion 14a. When the gasket is installed in an engine, the outer portion 14a is located between a cylinder head X and a cylinder block Y, and the inner portion 14b is located in the water hole Hw.

The inner portion 14b of the fluid hole regulation device 14 is divided into eight strips 14c in the shape of trapezoid. Spring plates 16 are attached to the respective strips 14c to push the strips 14c toward the center of the water hole Hw.

Figure 4:
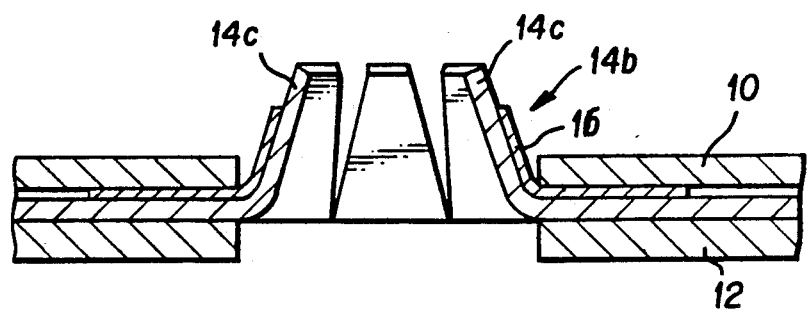
FIG. 4 is an explanatory section view of a part of the gasket for showing a fluid hole enlarged condition.

The fluid hole regulation device 14 is formed of a shape memory alloy, which is already known in the art. The shape memory alloy may be a Ti-Ni alloy, Cu-Zn-Al alloy or Fe-Mn-Si alloy. In the invention, when the temperature of water circulating through the engine reaches a predetermined value, the strips 14c of the fluid hole regulation device 14 deform to enlarge the water hole Hw. Namely, in the present invention, the fluid hole regulation device 14 is designed so that the strips 14c bend from a position as shown in FIG. 2 to a position as shown in FIG. 4 when a temperature of water flowing through the water hole Hw reaches a predetermined temperature, such as 80 degrees centigrade.

When an engine is started, the temperature of water in the engine is low, so that the fluid hole regulation device 14 is positioned as shown in FIG. 2. As a result, water flowing through the water hole Hw is restricted, whereby an engine is easily heated to a desired temperature.

When the engine is heated to a designed temperature, it is necessary to cool the engine. In this case, the strips 14c of the fluid hole regulation device 14 open as shown in FIG. 4 to allow large amount of water to flow through the engine. As a result, the engine is cooled properly by water circulating through the engine.

In the above embodiment the adjacent strips 14c are made entirely from the shape memory alloy. Alternatively, just the bending portions of strips 14c may be formed of the shape memory alloy, these bending portions being connected to the other portions by welding or gluing.

In accordance with the present invention, the fluid hole regulation device is assembled with the gasket, and directly control flow rate of water flowing through the engine based on the temperature of water of the engine. Accordingly, the temperature of the engine can be maintained at a desired condition.

While the invention has been explained with reference to the specific embodiments of the invention, the explanation is illustrative and the invention is limited only by the appended claims.

What is claimed is:

1. A gasket for an internal combustion engine with at least one fluid hole, comprising:
    a main body adapted to be installed in the engine and having at least one first hole communicating with the fluid hole of the engine;
    a fluid hole regulation device installed in the first hole of the main body, said fluid hole regulation device including a second hole, and a plurality of strips arranged so that a size of the second hole changes according to a temperature of the engine, at least bending portions of said strip being made of a shape memory alloy and bending to enlarge the size of the second hole when the temperature of water circulating through the engine increases beyond a predetermined temperature; and
    a plurality of spring members attached to the strips of the fluid hole regulation device, said spring members pushing the strips to return to a first position when the temperature of water circulating through the engine decreases beyond a predetermined temperature.

2. A gasket according to claim 1, wherein said main body comprises at least two plates, said fluid hole regulation device being situated between the two plates.

* * * * *